(12) United States Patent
Wu et al.

(10) Patent No.: US 10,315,351 B2
(45) Date of Patent: Jun. 11, 2019

(54) APPARATUS AND METHOD FOR IMPROVING PRODUCTION EFFICIENCY OF CRYSTALLIZER BOTTLENECK COOLING

(71) Applicant: GUANGZHOU TECH-LONG PACKAGING MACHINERY CO., LTD, Guangdong (CN)

(72) Inventors: Zhigang Wu, Guangdong (CN); Wei Zhang, Guangdong (CN); Huanlan Fan, Guangdong (CN); Jisheng Chen, Guangdong (CN); Yi Luo, Guangdong (CN)

(73) Assignee: GUANGZHOU TECH-LONG PACKAGING MACHINERY CO., LTD, Guangzhou (CN)

( * ) Notice: Subject to any disclaimer, the term of this patent is extended or adjusted under 35 U.S.C. 154(b) by 252 days.

(21) Appl. No.: 15/315,274

(22) PCT Filed: Jun. 4, 2015

(86) PCT No.: PCT/CN2015/080819
§ 371 (c)(1),
(2) Date: Nov. 30, 2016

(87) PCT Pub. No.: WO2016/107079
PCT Pub. Date: Jul. 7, 2016

(65) Prior Publication Data
US 2017/0190094 A1    Jul. 6, 2017

(30) Foreign Application Priority Data

Dec. 31, 2014  (CN) .......................... 2014 1 0857464

(51) Int. Cl.
*B29C 49/28* (2006.01)
*B29C 49/64* (2006.01)
(Continued)

(52) U.S. Cl.
CPC .............. *B29C 49/28* (2013.01); *B29C 49/64* (2013.01); *B29C 49/6481* (2013.01);
(Continued)

(58) Field of Classification Search
None
See application file for complete search history.

(56) References Cited

U.S. PATENT DOCUMENTS 8,951,036 B2    2/2015  Tsuchiya

FOREIGN PATENT DOCUMENTS

CN         1288811 A    3/2001
CN       201712168 U    1/2011
(Continued)

*Primary Examiner* — Monica A Huson
(74) *Attorney, Agent, or Firm* — Lucas & Mercanti, LLP

(57) ABSTRACT

An apparatus and method improves the production efficiency of crystallizer bottleneck cooling. The apparatus includes a cooling turntable, a plurality of cooling head assemblies, a cam plate of preform insertion, a cam plate of preform lifting and a cam plate of preform release, a protective sleeve on a crystallization chain. The preform is set in a protective sleeve with the preform neck exposed at the protective sleeve, and the cooling head assemblies are mounted on the cooling turntable and set at the top of the protective sleeve. The cooling head assembly includes a upper mounting plate and a lower mounting plate, a cooling shaft body, a guide shaft. The upper mounting plate is provided with an upper roller, the lower mounting plate is provided with a lower roller. The cam plate of preform insertion, cam plate of preform lifting and cam plate of preform release are mounted on the rotating path of the cooling head assembly.

10 Claims, 5 Drawing Sheets

(51) Int. Cl.
*B29C 49/68* (2006.01)
*B29C 71/00* (2006.01)

(52) U.S. Cl.
CPC .......... *B29C 49/68* (2013.01); *B29C 71/0063* (2013.01); *B29K 2995/0041* (2013.01)

(56) References Cited

FOREIGN PATENT DOCUMENTS

| | | |
|---|---|---|
| CN | 103079794 A | 5/2013 |
| CN | 104552899 A | 4/2015 |
| CN | 204505810 U | 7/2015 |

APPARATUS AND METHOD FOR IMPROVING PRODUCTION EFFICIENCY OF CRYSTALLIZER BOTTLENECK COOLING

CROSS-REFERENCE TO RELATED APPLICATIONS

This application is a 371 of PCT/CN2015/080819 filed Jun. 4, 2015, which in turn claims the priority of CN 2014108574644 filed Dec. 31, 2014, the priority of both applications is hereby claimed and both applications are incorporated herein by reference.

BACKGROUND OF THE INVENTION

The present invention relates to crystallizer technology, particularly to an apparatus and a method for improving production efficiency of crystallizer bottleneck cooling.

For the traditional crystallizer, the bottleneck is cooled down as shown in FIG. 1: at point A, the cooling head starts to insert into the preform for cooling, rotates counterclockwise to point B in place, and rotates counterclockwise to point C to start extracting from the preform, and realizes extraction at point D and ends the cooling. Its shortcoming is that the whole crystallizer production efficiency of bottleneck cooling is relatively low when the time for cooling a single bottleneck is constant.

BRIEF SUMMARY OF THE INVENTION

Based on this, it is necessary to provide an apparatus and method to improve the production efficiency of crystallizer bottleneck cooling against the deficiencies of the prior art.

An apparatus for improving the production efficiency of crystallizer bottleneck cooling, including a cooling turntable, a plurality of cooling head assemblies, a cam plate of preform insertion, a cam plate of preform lifting and a cam plate of preform release. The crystallization chain of the crystallizer is set along the outer periphery of the cooling turntable, and a protective sleeve is provided on the crystallization chain, and the preform is set in the protective sleeve with the preform neck exposed at the protective sleeve. A plurality of cooling head assemblies are mounted on the cooling turntable with its axis as the center, and the cooling head assemblies are set at the top of the protective sleeve. The cooling head assembly includes an upper mounting plate and a lower mounting plate disposed vertically stacked, and a cooling shaft body, a guide shaft connected to the cooling turntable. The guide shaft goes through in turn the upper mounting plate and the lower mounting plate, a spacer is set between the upper mounting plate and the lower mounting plate. The cooling shaft body is fixed to the upper mounting plate, and the shaft head of the cooling shaft body is exposed through the lower mounting plate. An upper roller is set at least one side of the upper mounting plate parallel to the cooling turntable in the tangential direction, and a lower roller is set at the side of the lower mounting plate at the same side of the upper roller. The cam plate of preform insertion, cam plate of preform lifting and cam plate of preform release are mounted in the rotational path of the cooling head assembly, the cam plate of preform insertion is set at the inlet where the crystallization chain goes into the cooling turntable, the cam plate of preform lifting is set at the outlet where the crystallization chain goes out around the cooling turntable, and rotates in the direction of the cooling turntable rotation, with the inlet as the starting point. The cam plate of preform release is set at the downstream of the cam plate of preform lifting, and the cam plate of preform insertion lies above the upper roller, the cam plate of preform lifting lies below the lower roller, the cam plate of preform release lies between the upper roller and the lower roller.

The further technical program is as follows:

The cam plate of preform release is set near the cam plate of preform insertion.

The cooling head assembly further includes a upper linear bush, a lower linear bush, both of them are attached on the guide shaft, the spacer is disposed between the upper linear bush and the lower linear bush, and the upper mounting plate is attached on the upper linear bush, the lower mounting plate is attached on the lower linear bush.

The cooling head assembly further comprises a stripper ring, which is attached on the shaft head of the cooling shaft body, and fixed to the lower mounting plate.

The apparatus for improving the production efficiency of crystallizer bottleneck further comprises a preform release rail, which is set correspondingly below the cam plate of preform release, and a guide rail groove accommodating the lower roller is formed between lower end face of the cam plate of preform release and the upper end face of the preform release rail.

Along the direction of rotation of the cooling turntable, the lower end face of the cam plate of preform insertion appears a gradually downward trend, the upper end face of the cam plate of preform lifting appears a gradually rising trend, and the upper end face of the cam plate of preform release appears a gradually rising trend.

On both sides of the upper mounting plate parallel to the cooling turntable in the tangential direction are provided with upper rollers, and on both sides of the lower mounting plate parallel to the cooling turntable in the tangential direction are provided with lower rollers 260, and the cam plate of preform insertion is provided above both of the upper rollers and the cam plate of preform lifting is provided below both of the lower rollers, and the cam plate of preform release is provided between the upper roller and the lower roller at the same side.

A method for improving the production efficiency of the crystallizer bottleneck cooling, comprises the following steps:

The crystallization chain rotates around the outer periphery of the cooling turntable along the turntable rotation direction, and the cooling turntable drives the cooling head assembly to rotate;

When the upper roller of the cooling head assembly moves along the lower end face of the cam plate of preform insertion, the shaft head of the cooling shaft body inserts gradually into the preform in protecting sleeve on the crystallization chain and begins heat exchange;

The crystallization chain and the cooling turntable rotate synchronously. When the lower roller of the cooling head assembly moves along the upper end face of the cam plate of preform lifting, the shaft head of the cooling shaft body and the preform move upward and gradually separate from the crystallization chain;

The cooling turntable drives the preform separated from the crystallization chain to rotate continuously. When the upper roller of the cooling head assembly moves along the upper end face of the cam plate of preform release, and the lower roller of the cooling head assembly moves along the lower end face of the cam plate of preform release, the shaft head of the cooling shaft body moves upward, the preform on it is stopped by the lower mounting plate of the cooling head assembly, and separated from the shaft head of the cooling shaft body, thus ending the heat exchange.

The technical program is further described as follows:

When the upper roller of the cooling head moves along the upper end face of the cam plate of preform release, it will further comprise the steps as follows:

The lower roller of the cooling head assembly moves along the guide rail groove formed between of lower end face of the cam plate of preform release and the upper end face of the preform release guide rail.

When the upper roller of the cooling head moves along the upper end face of the cam plate of preform release, and the shaft head of cooling shaft body moves upward, it will further comprise the steps as follows:

The preform on the shaft head of the cooling shaft body is stopped by the stripper ring on the lower end face of the lower mounting plate, and gradually separated from the shaft head of the cooling shaft body.

Next, the advantages of the aforementioned technical solutions or principles will be described:

In the above-mentioned apparatus and method for improving the production efficiency of the crystallizer bottleneck cooling, the preform listing and the preform release are separated from each other by setting of the cam plate of preform insertion, the cam plate of preform lifting and the cam plate of preform release. The time of the cooling head assembly rotates from the cam plate of preform insertion to the cam plate of preform release is the time for the cooling of a single preform. Compared to the traditional way of crystallizer cooling of the bottleneck, the cooling head assembly line speed has been increased for the same cooling time of a single preform and the same radius of gyration of the crystallization chain. Since the cooling head assembly line speed is the same as that of the crystallization chain, so the line speed of the crystallization chain has also been improved, so that the production efficiency of the crystallizer cooling of the bottleneck is increased.

Figure 1:
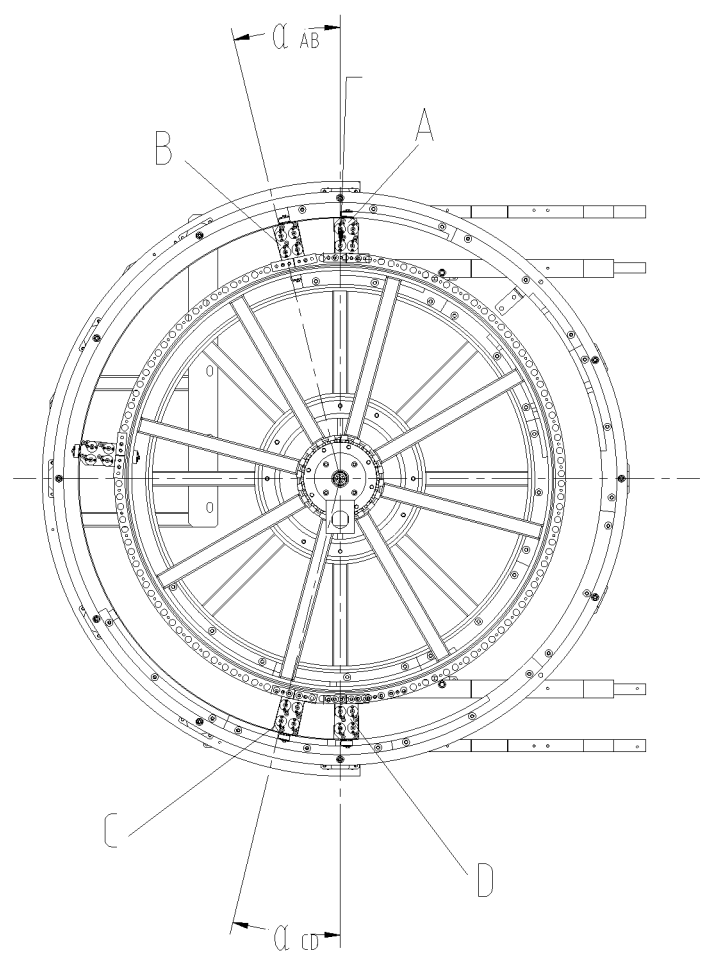
FIG. 1 is a schematic view of a conventional crystallizer bottleneck cooling.

EXPLANATION OF INDICATIONS IN THE DRAWINGS 1. crystallization chain, 2, protective sleeve, 3. preform, 4. water jacket 10. cooling turntable, 20. cooling head assembly, 210. upper mounting plate, 220. lower mounting plate, 230. cooling shaft body, 240. guide shaft, 250. upper roller, 260. lower roller, 270. upper linear bush, 280. lower linear bush, 290. stripper ring, 30. cam plate preform insertion embryos, 40. cam plate of preform lifting, 50. cam plate of preform release, 60. guide rail for preform release, 70. Guide rail groove.

DETAILED DESCRIPTION OF THE PREFERRED EMBODIMENTS

Figure 4:
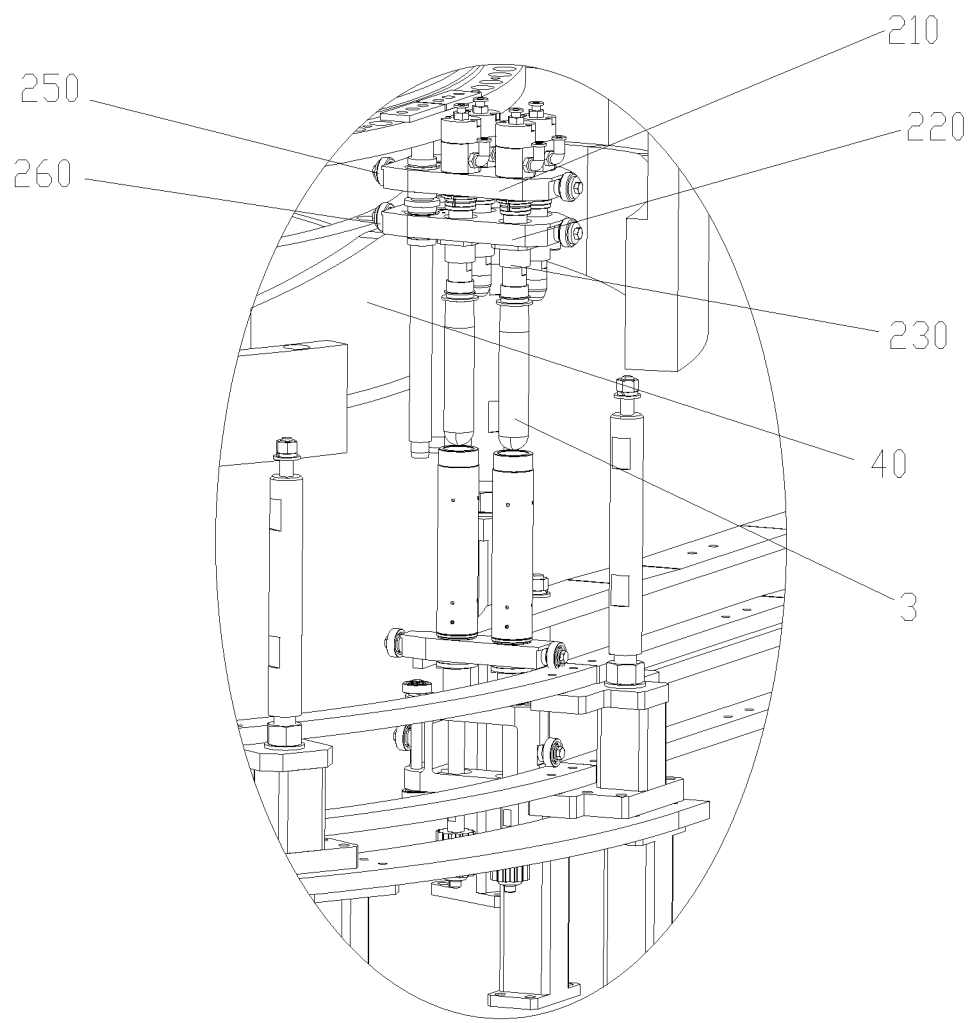
FIG. 4 is a partial schematic diagram of the preform lifting state of the apparatus in an embodiment of the invention.
Figure 5:
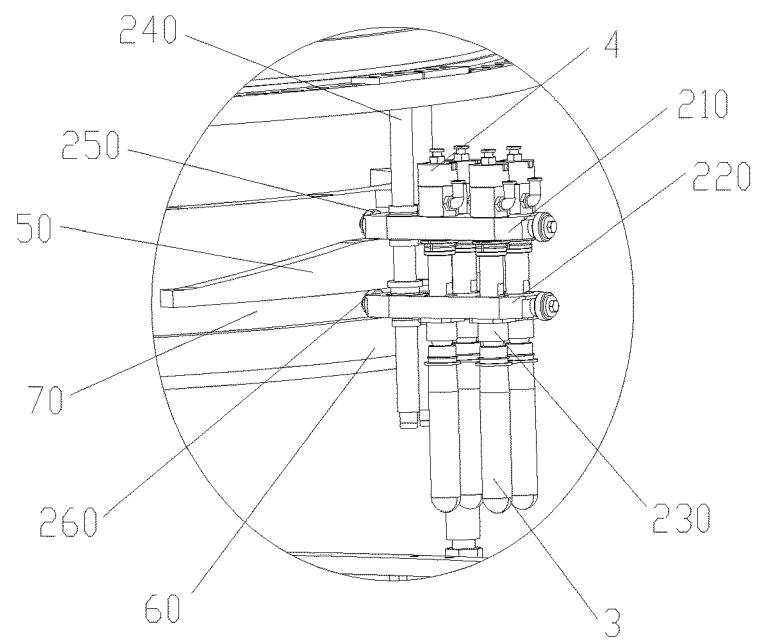
FIG. 5 is a partial schematic diagram of the preform release state of the apparatus in an embodiment of the invention.
Figure 6:
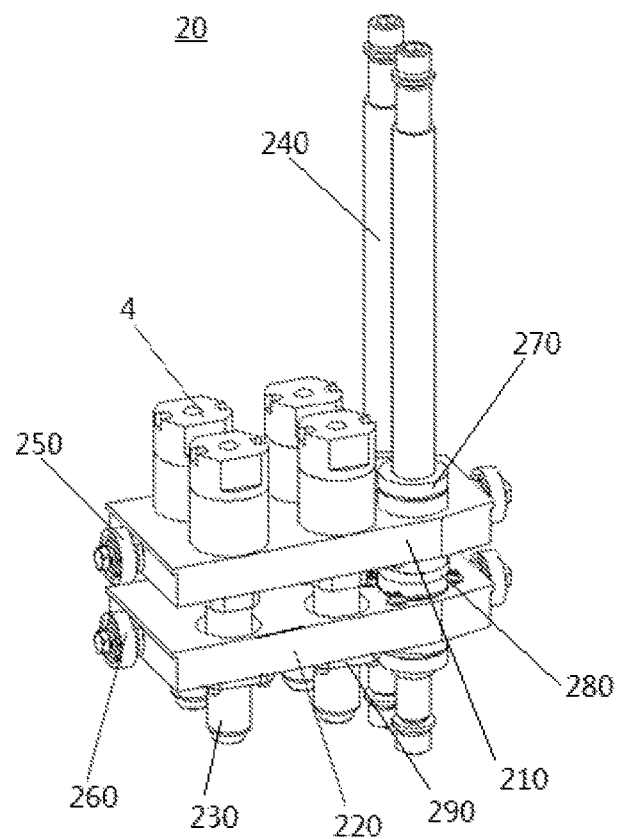
FIG. 6 of structure schematic diagram of the cooling head assembly in an embodiment of the present invention.

As shown in FIG. 2 to FIG. 6, an apparatus for improving the production efficiency of crystallizer bottleneck cooling, includes the cooling turntable 10, a plurality of cooling head assembly 20, cam plate of preform insertion 30, cam plate of preform lifting 40, cam plate of preform release 50. The crystallization chain 1 of the crystallizer is set along the outer periphery of the cooling turntable 10. The crystallization chain 1 is provided with a protective sleeve 2, preform 3 is provided in the protective sleeve 2, and the neck of the preform is exposed at the protective sleeve 2, a plurality of cooling head assemblies 20 are mounted on the cooling turntable 10 with the axis of cooling turntable 10 as the center, and the cooling head assemblies 20 are disposed above the protective sleeve 2. The cooling head assembly 20 includes a upper mounting plate 210 and a lower mounting plate 220 stacked from top to bottom, the cooling shaft body 230, and the guide shaft 240 connected to the cooling turntable 10. The guide shaft 240 goes in turn through the upper mounting plate 210 and lower mounting plate 220, a spacer is provide between the upper mounting plate 210 and the lower mounting plate 220 (not shown in the Figure). The cooling shaft body 230 is fixed to the upper mounting plate 210, and the shaft head of the cooling shaft body 230 is exposed through the lower mounting plate 220. The upper roller 250 is set at least one side of the upper mounting plate 210 parallel to the cooling turntable 10 in the tangential direction, and the lower roller 260 is set at the side of the lower mounting plate 210 at the same side of the upper roller 250. The cam plate of preform insertion 30, the cam plate of preform lifting 40 and the cam plate of preform release 50 are installed in the rotational path of the cooling head assembly 20, the cam plate of preform insertion 30 is provided at the inlet where the crystallization chain 1 goes into the cooling turntable 10, namely AB section. The cam plate of preform lifting 40 is provided at the outlet where the crystallization chain 1 goes out around the cooling turntable 10, namely EF section, with the inlet as the starting point, rotates along the rotation direction of the cooling turntable 10. The cam plate of preform release 50 is provided at the downstream of the cam plate of preform lifting 40, namely GH section. The cam plate of preform insertion 30 is located above the upper roller 250, the cam plate of preform lifting 40 is located below the lower roller 260, the cam plate of preform release 50 is located between the upper roller 250 and lower roller 260. As shown in FIG. 6, in this invention, on both sides of the upper mounting plate 210 parallel to the cooling turntable 10 in tangential direction are provided with upper roller 250, and at both sides of the lower mounting plate 220 parallel to the cooling turntable 10 in tangential direction are provided with lower roller 260. And above the two upper rollers 250 are provided with a cam plate of preform insertion 30, and below the two lower rollers 260 is provided with a cam plate of preform lifting 40, between the upper roller 250 and the lower roller 260 at the same side is provide with a cam plate of preform release 50. Such setting leads to stress of both sides at the same time when the cooling head assembly moves up or down, so as to maintain a balance on both sides, avoiding emergence of the situation that the insertion, lifting and release of preform failing in place.

By setting the cam plate of preform insertion 30, the cam plate of preform lifting cam plate 40 and the cam plate of preform release 50, the preform lifting and preform release are separated from each other. The time of the cooling head assembly 20 rotates from the cam plate of preform insertion 30 to the cam plate of preform release 50 is the time for the cooling of a single preform.

Compared to the traditional way of crystallizer cooling of the bottleneck, the line speed of the cooling head assembly 20 has been increased for the same cooling time of a single preform and the same radius of gyration of the crystallization chain 1. Since the line speed the cooling head assembly 20 is the same as that of the crystallization chain 1, so the line speed of the crystallization chain 1 has also been improved, so that the production efficiency of the crystallizer cooling of the bottleneck is increased.

And since the cam plate of preform insertion 30 is set at the inlet where the crystallization chain 1 goes into the cooling turntable 10, the cam plate of preform lifting 40 is set the outlet where the crystallization chain 1 goes out around the cooling turntable 10, the preform neck in the protective sleeve 2 has sufficient time to be cooled, so that during preform lifting, the bottleneck can be held on the shaft head of the cooling shaft body 230 because of shrinkage after cooling and will not fall. As to the traditional crystallizer bottleneck cooling, due to the constant cooling time and the constant rotation distance of the crystallization chain and the preform during cooling, the speed cannot be increased.

Figure 2:
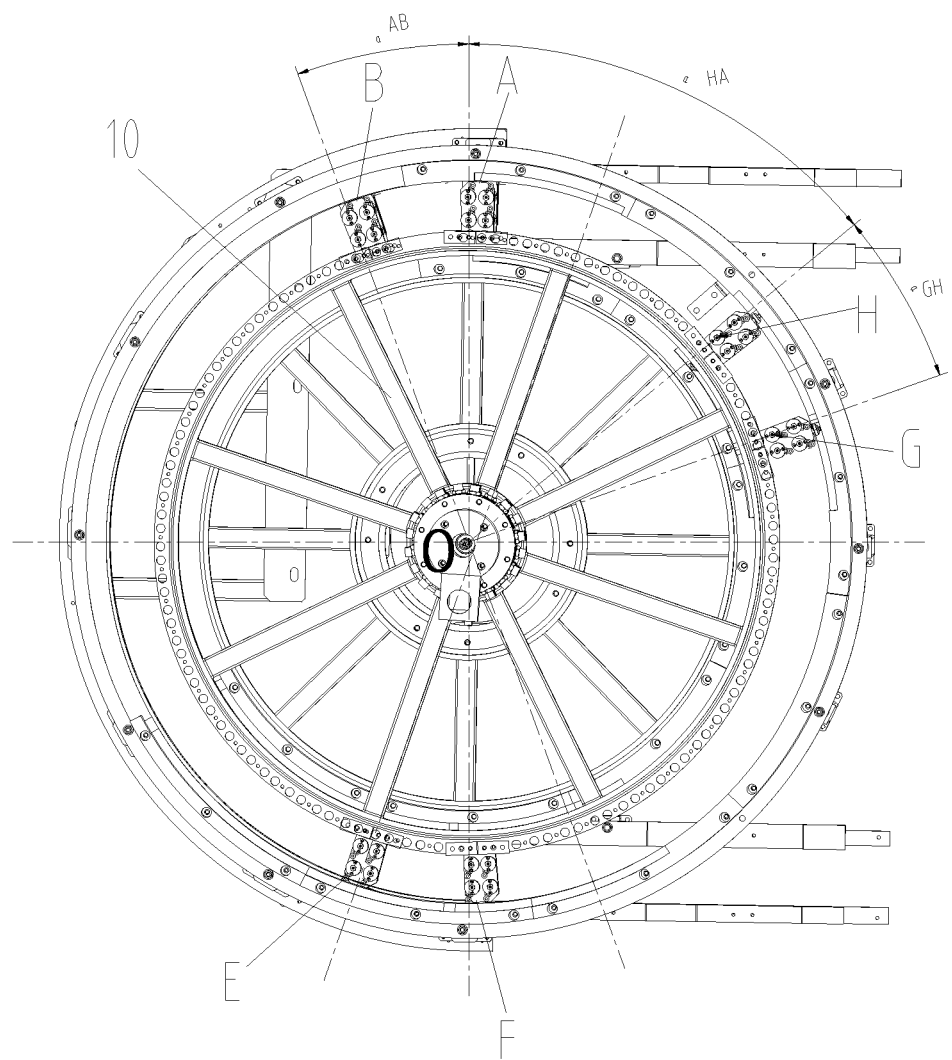
FIG. 2 is the of the overall schematic diagram of the apparatus for improving the cooling production efficiency of crystallizer bottleneck cooling in an embodiment of the present invention.

Referring to FIG. 1, cooling time for a single preform neck is t, the traditional crystallizer bottleneck cooling efficiency is relatively low, and is calculated as follows:

V1—traditional crystallization chain moving speed, R—crystallization chain radius of gyration, $\omega_1$—traditional crystallization chain angular velocity, $\alpha_{AB}$—preform insertion section, $\alpha_{CD}$—preform lifting section and preform release section, $n_1$—traditional crystallization chain speed;

$V1=R\times\omega_1$, because $\omega_1=2n_1\pi$, $n_1=(180-\alpha_{AB}-\alpha_{CD})/360/t$, substitute it into the above equation, we get:

$V1=R\times 2n_1\pi=2\pi R(180-\alpha_{AB}-\alpha_{CD})/360/t$ (mm/s);

Referring to FIG. 2, under the assumption of same cooling time for a single preform and same radius of gyration of the crystalline chain 1, the linear velocity of the cooling head assembly 20 in the present embodiment V2>V1. Since the linear velocity of the cooling head assembly 20 is the same as the crystalline chain 1 linear velocity, so the line speed of crystallization chain 1 is higher than the original, and the production efficiency of crystallizer finish cooling is improved. The calculation formula is as follows:

V2—the crystallization chain 1 moving speed in the embodiment, R—radius of gyration of crystallization chain 1, $\omega_1$—angular velocity of the crystallization chain 1 in the embodiment, $\alpha_{AB}$—preform insertion section, $\alpha_{EF}$—preform lifting section, $\alpha_{GH}$—preform release section, $\alpha HA$—the angle between straight line OA and OH, n2—revolution speed of crystallization chain 1 in the embodiment;

$V2=R\times\omega_2$, for $\omega_2=2n_2\pi$, $n_2=(360-\alpha_{AB}-\alpha_{GH}-\alpha_{HA})/360/t$, substitute it into the above equation and get:

$V2=R\times 2n_2\pi=2\pi R(360-\alpha_{AB}-\alpha_{GH}-\alpha_{HA})/360/t$ (mm/s)

for $\alpha_{HA}<180°$, therefore V2>V1;
suppose: $\alpha_{AB}=\alpha_{CD}=\alpha_{GH}=10°$, $\alpha_{HA}=60°$ then: V2/V1=280/160=1.75=175%, the production efficiency increases by 75%.

The cam plate of preform release 50 is provided near the cam plate of preform insertion 30 in this embodiment, which can reduce the angle between the cam plate of preform release 50 and the cam plate of preform insertion 30, thus increase line speed of the cooling head assembly 20 and that of the crystallization chain 1, further improve the production efficiency.

As shown in FIG. 3-6, the cooling head assembly 20 also includes stripper ring 290 in the embodiment, the stripper ring 290 is attached on the shaft head of the cooling shaft body 230, and fixed to the lower mounting plate 220. By setting the stripper ring 290, the preform becomes more smoothly, and will not harm the preform neck.

The apparatus for improving the production efficiency of crystallizer bottleneck cooling further comprises preform release guide rail 60, the release guide rail 60 is correspondingly below the cam plate of preform release 50. The guide rail groove 70 containing the lower roller 260 forms between the lower end face of the cam plate of preform release 50 and the upper end face of the preform release guide rail 60. With the guide rail groove 70, the lower mounting plate 220 remains relatively stationary in the vertical direction during preform release, so that the preform and the cooling shaft 230 separates from each other quickly and smoothly.

Based on the rotation direction of the cooling turntable 10, the rotation direction of the cooling turntable 10 in the embodiment is counterclockwise. The lower end face of the cam plate of preform insertion 30 shows gradually downward trend, and drives the cooling head assembly 20 to move down overall. The upper end face of the cam plate of preform lifting 40 shows gradually upward trend, and drives the cooling head assembly 20 to move upward overall. The upper end face of the cam plate of preform release 50 shows gradually upward trend, drives the upper mounting plate 210 to gradually move upward relative to the lower mounting plate 220.

Figure 3:
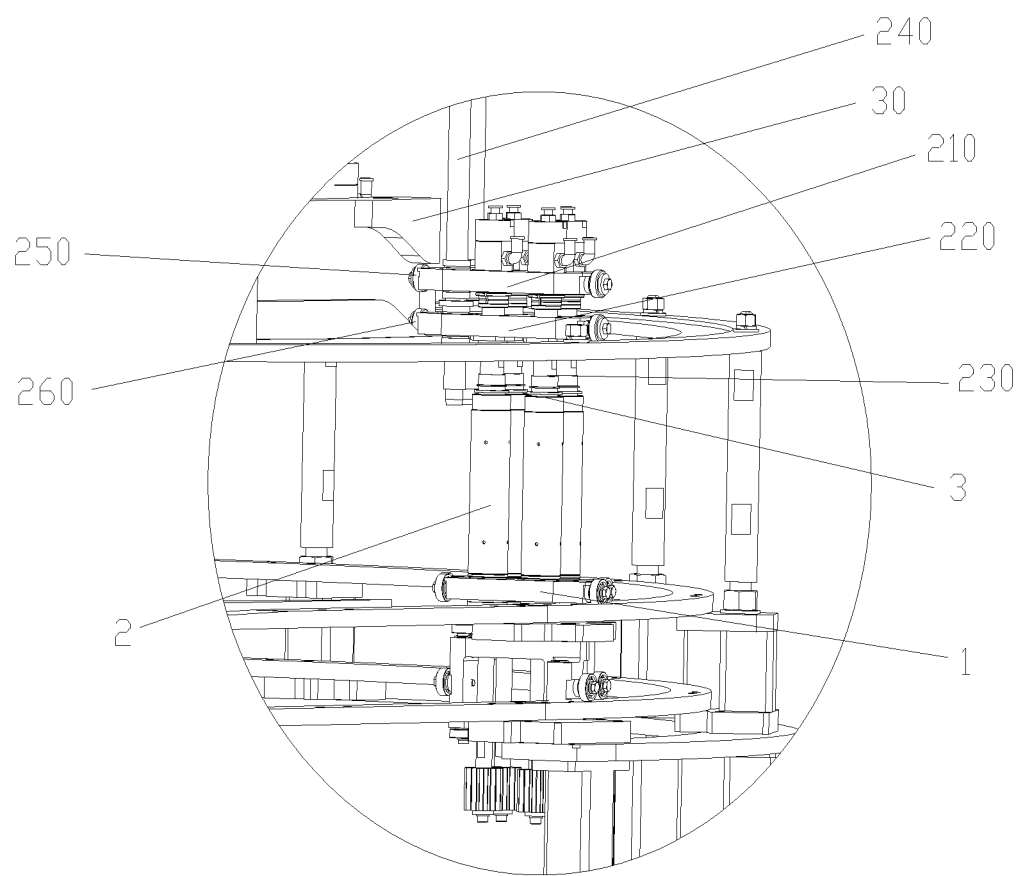
FIG. 3 is a partial schematic diagram of the preform insertion state of the apparatus in an embodiment of the invention.

Referring to FIG. 3 to FIG. 5, the principle of the apparatus for improving the production efficiency of crystallizer bottleneck cooling in this embodiment is described below:

State of cooling start A→B:(see FIG. 3)

The cam plate of preform insertion 30 and the upper roller 250 compose a cam mechanism, and the cam plate of preform insertion 30 is relatively static. When the cooling head assembly 20 rotates around the rotation center (Referring to FIG. 1), the lower surface of the cam plate of preform insertion 30 will push down on the upper roller 250 to make it move downward according to the operating principle of the cam mechanism. For the upper roller 250 and the upper mounting plate 210 are coupled together, and the cooling shaft body 230 is fixed to the upper mounting plate 210, so it drive the shaft body 230 to insert into the preform neck along the direction of guide shaft 240, and to start heat exchange (the cooling shaft body 230 is cooled with cold water circulating, and cold water goes into the cooling shaft body 230 from the water jacket 4).

State of preform lifting E→F:(see FIG. 4)

The cam plate of preform lifting 40 and the lower roller 260 compose a cam mechanism, and the cam plate of preform lifting 40 is relatively static. When the cooling head assembly 20 rotates around the rotation center (Referring to FIG. 1), the upper surface of the cam plate of preform lifting 40 will push up on the lower roller 260 to make it move upward according to the operating principle of the cam mechanism. Since the lower roller 260 and the lower mounting plate 220 are coupled together, the lower mounting plate 220 and the upper mounting plate 210 can slide along the guide shaft 240, the lower mounting plate 220 will push the upper mounting plate 210 to move upward, drive the cooling shaft body 230 and the preform to move upward and separate from the crystalline chain 1, the preform neck will be held on the shaft head of the cooling shaft body 230 because of shrinkage after cooling.

State of cooling end G→H:(see FIG. 5)

The cam plate of preform release 50 and the upper roller 250 compose a cam mechanism, and the cam plate of preform release 50 is relatively static. When the cooling head assembly 20 rotates around the rotation center (Referring to FIG. 1), the upper surface of the cam plate of preform release 50 will push down up the upper roller 250 to make it move upward linearly according to the operating principle of the cam mechanism. For the upper roller 250 and the upper mounting plate 210 are coupled together, and the cooling shaft body 230 is fixed to the upper mounting plate 210, so it will drive the cooling shaft body 230 to move upward. At the same time, the lower roller 260 will roll in the guide rail groove 70 formed between the cam plate of preform release 50 and the preform release guide rail 60, and relative rest will be kept in the vertical direction. The lower roller 260 and the stripper ring 290 are fixed to the lower mounting plate 220, so stripper ring 290 remains relatively stationary in the vertical direction. When the preform and the cooling shaft body 230 moves upward at the same time, the upper surface of the preform will be stopped by the lower surface of the stripper ring 290, and the contact area with the cooling shaft body 230 will be gradually reduced until it is completely separated from the cooling shaft body 230 and the cooling state comes to an end, then the preform will fall into the hopper under the action of the gravity.

As shown in FIG. 6, the cooling head assembly 20 further includes a upper linear bush 270, a lower linear bush 280, both of them are attached on the guide shaft 240, the spacer is disposed between the upper linear bush 270 and the lower linear bush 280, and the upper mounting plate 210 is attached to the upper linear bush 270, the lower mounting plate 220 is attached on the lower linear bush 280. By setting of the upper linear bush 270 and the lower linear bush 280, the upper mounting plate 210 and the lower mounting plate 220 can move up and down along the guide shaft 240 more smoothly.

A method for improving the production efficiency of the crystallizer bottleneck cooling, comprises the following steps:

The crystallization chain 1 rotates around the outer periphery of the cooling turntable 10 along rotation direction of the cooling turntable 10, and the cooling turntable 10 drives the cooling head assembly 20 to rotate;

When the upper roller 250 of the cooling head assembly 20 moves along the lower end face of the cam plate of preform insertion 30, the shaft head of the cooling shaft body 230 inserts gradually into the preform in the protecting sleeve 2 on the crystallization chain 1 and begins heat exchange;

The crystallization chain 1 and the cooling turntable 10 rotate synchronously. When the lower roller 260 of the cooling head assembly 20 moves along the upper end face of the cam plate of preform lifting 40, the shaft head of the cooling shaft body 230 and the preform move upward and gradually separate from the crystallization chain 1;

The cooling turntable 10 drives the preform separated from the crystallization chain 1 to rotate continuously. When the upper roller 250 of the cooling head assembly 20 moves along the upper end face of the cam plate of preform release 50, and the lower roller 260 of the cooling head assembly 20 moves along the guide rail groove formed between the lower end face of the cam plate of preform release 50 and the upper end face of the preform release guide rail 60, the shaft head of the cooling shaft body 20 moves upward, the preform on it is stopped by the stripping ring 290 on the lower end face of the lower mounting plate 220 of the cooling head assembly 20, and separated from the shaft head of the cooling shaft body 230, thus ending the heat exchange.

This method is effective to increase the speed of the crystallization chain 1 and the cooling turntable 10, thereby to improve the production efficiency of the crystallizer finish cooling.

The technical features of the above embodiments may be made into any combination. For concise description, not all possible combinations of technical features for each of the embodiments have been described above. However, as long as the combination of these features shows no contradiction, it should be considered as included in the present specification.

The above-described embodiment is merely the expression of several embodiments of the present invention, the description is somewhat specific and detailed, but it can not be construed as limiting the scope of the invention patent. It should be noted that those of ordinary skilled in the art can also make a number of modifications and improvements without departing from the idea of the invention, which fall within the protection scope of the present invention. Accordingly, the scope of the present invention patent protection should prevail in the appended claims.

The invention claimed is:

1. An apparatus for improving the production efficiency of crystallizer bottleneck cooling, comprising:
   a cooling turntable;
   a plurality of cooling head assemblies;
   a cam plate of a preform insertion;
   a cam plate of a preform lifting;
   a cam plate of a preform release;
   a crystallization chain along an outer periphery of the cooling turntable; and
   a protective sleeve on the crystallization chain,
   wherein the preform insertion is set in the protective sleeve with a preform neck exposed at the protective sleeve,
   wherein the plurality of cooling head assemblies are mounted on the cooling turntable with its axis as the center, and the cooling head assemblies are set at a top of the protective sleeve,
   wherein the plurality of cooling head assemblies include an upper mounting plate and a lower mounting plate disposed vertically stacked, a cooling shaft body, and a guide rail shaft connected to the cooling turntable,
   wherein the guide rail shaft goes through, in turn, the upper mounting plate and the lower mounting plate, and wherein a spacer is set between the upper mounting plate and the lower mounting plate,
   wherein the cooling shaft body is fixed to the upper mounting plate, and a shaft head of the cooling shaft body is exposed through the lower mounting plate,
   wherein an upper roller is set at at least one side of the upper mounting plate parallel to the cooling turntable in a tangential direction, and a lower roller is set at the side of the lower mounting plate at the same side of the upper roller,
   wherein the cam plate of a preform insertion, cam plate of a preform lifting and cam plate of a preform release are mounted in a rotating path of the plurality of cooling head assemblies, the cam plate of a preform insertion is set at an inlet where the crystallization chain goes into the cooling turntable, the cam plate of a preform lifting is set at an outlet where the crystallization chain goes around the turntable, and rotates in the direction of the cooling turntable rotation, with the inlet as the starting point, and wherein the cam plate of a preform release is set downstream of the cam plate of a preform lifting, and the cam plate of a preform insertion lies above the upper roller, the cam plate of a preform lifting lies below the lower roller, and the cam plate of a preform release lies between the upper roller and the lower roller.

2. An apparatus for improving the production efficiency of crystallizer bottleneck cooling according to claim 1, wherein the cam plate of a preform release is provided near the cam plate of a preform insertion.

3. An apparatus for improving the production efficiency of crystallizer bottleneck cooling according to claim 1, wherein the said plurality of cooling head assemblies further includes an upper linear bush and a lower linear bush, both attached on the guide rail shaft, and wherein the spacer is provided between the upper linear bush and the lower linear bush, and wherein the upper mounting plate is attached on the upper linear bush and wherein the lower mounting plate is attached on the lower linear bush.

4. An apparatus for improving the production efficiency of crystallizer bottleneck cooling according to claim 3, wherein the plurality of cooling head assemblies further includes a stripper ring attached on the shaft head of the cooling shaft body and fixed to the lower mounting plate.

5. An apparatus for improving the production efficiency of crystallizer bottleneck cooling according to claim 4, further including a preform release guide rail, which is disposed correspondingly below the cam plate of a preform release, and wherein a guide rail groove containing the lower roll is formed between the lower end face of the cam plate of preform release and the upper end face of the preform release guide rail.

6. An apparatus for improving the production efficiency of crystallizer bottleneck cooling according to claim 1, wherein along the direction of rotation of the cooling turntable, a lower end face of the cam plate of a preform insertion appears a gradually downward trend, an upper end face of the cam plate of a preform lifting appears a gradually rising trend, and an upper end face of the cam plate of a preform release appears a gradually rising trend.

7. An apparatus for improving the production efficiency of crystallizer bottleneck cooling according to claim 1, wherein upper rollers are provided on both sides of the upper mounting plate parallel to the cooling turntable in a tangential direction, and lower rollers are provided on both sides of the lower mounting plate parallel to the cooling turntable in a tangential direction, and the cam plate of a preform insertion is provided above both of the upper rollers and the cam plate of a preform lifting is provided below both of the lower rollers, and the cam plate of a preform release is provided between the upper roller and the lower roller at the same side.

8. A method for improving the production efficiency of the crystallizer bottleneck cooling, comprising the following steps:

rotating a crystallization chain around an outer periphery of a cooling turntable along the turntable rotation direction, wherein the cooling turntable rotatably drives a cooling head assembly;

moving an upper roller of the cooling head assembly along a lower end face of a cam plate of a preform insertion, wherein a shaft head of a cooling shaft body is inserted gradually into the preform insertion in a protecting sleeve on a crystallization chain and begins a heat exchange;

rotating the crystallization chain and the cooling turntable synchronously, wherein a lower roller of the cooling head assembly moves along an upper end face of the cam plate of a preform lifting, and the shaft head of the cooling shaft body and the preform lifting move upward and gradually separate from the crystallization chain; and moving the cooling turntable to rotate the preform lifting separate from the crystallization chain to rotate continuously, wherein when the upper roller of the cooling head assembly moves along the upper end face of the cam plate of a preform release, and the lower roller of the cooling head assembly moves along the lower end face of the cam plate of the preform release, the shaft head of the cooling shaft body moves upward, the preform release on it is stopped by a lower mounting plate of the cooling head assembly, and is separated from the shaft head of the cooling shaft body, thus ending the heat exchange.

9. A method for improving the production efficiency of the crystallizer bottleneck cooling according to claim 8, wherein when the upper roller of the cooling head moves along the upper end face of the cam plate of a preform release, the lower roller of the cooling head assembly will move along the guide rail groove formed between the lower end face of the cam plate of a preform release and an upper end face of a preform release guide rail.

10. A method for improving the production efficiency of the crystallizer bottleneck cooling according to claim 8, wherein when the upper roller of the cooling head moves along the upper end face of the cam plate of a preform release, and the shaft head of cooling shaft body moves upward, the preform release on the shaft head of the cooling shaft body is stopped by a stripper ring on a lower end face of the lower mounting plate of the cooling head assembly, and is gradually separated from the shaft head of the cooling shaft body.

* * * * *